(12) United States Patent
Lauren

(10) Patent No.: US 9,622,553 B2
(45) Date of Patent: Apr. 18, 2017

(54) SYSTEM AND METHODS FOR ASSEMBLING CHAIN ELEMENTS USING A COUPLING MECHANISM

(71) Applicant: Ben Zion Lauren, Rehovot (IL)

(72) Inventor: Ben Zion Lauren, Rehovot (IL)

(*) Notice: Subject to any disclaimer, the term of this patent is extended or adjusted under 35 U.S.C. 154(b) by 0 days.

(21) Appl. No.: 14/757,449

(22) Filed: Dec. 23, 2015

(65) Prior Publication Data

US 2016/0192745 A1 Jul. 7, 2016

Related U.S. Application Data

(60) Provisional application No. 62/096,567, filed on Dec. 24, 2014.

(51) Int. Cl.

| | | |
|---|---|---|
| *F16G 13/12* | (2006.01) | |
| *A44C 5/10* | (2006.01) | |
| *B65G 17/08* | (2006.01) | |
| *B65G 17/32* | (2006.01) | |
| *A44C 13/00* | (2006.01) | |
| *A63H 33/06* | (2006.01) | |
| *A44C 11/00* | (2006.01) | |

(52) U.S. Cl.
CPC ............. *A44C 5/105* (2013.01); *A44C 5/102* (2013.01); *A44C 11/00* (2013.01); *A44C 13/00* (2013.01); *A63H 33/062* (2013.01); *B65G 17/08* (2013.01); *B65G 17/326* (2013.01)

(58) Field of Classification Search
CPC ......... A44C 5/105; A44C 13/00; A44C 5/102; B65G 17/08; B65G 17/326; A63H 33/062

USPC ............................................................ 59/80
See application file for complete search history.

(56) References Cited

U.S. PATENT DOCUMENTS

| | | | | | |
|---|---|---|---|---|---|
| 1,440,230 | A | * | 12/1922 | Mestekin | A44C 5/102 59/80 |
| 2,972,833 | A | * | 2/1961 | La Grutta | A63H 33/062 446/110 |
| 3,604,203 | A | * | 9/1971 | Hofmann | A44C 5/105 52/108 |
| 4,473,365 | A | * | 9/1984 | Lapeyre | B65G 17/08 198/850 |

(Continued)

FOREIGN PATENT DOCUMENTS

| | | |
|---|---|---|
| CN | 202 360 129 U | 12/2011 |
| DE | 10 2004 014505 A1 | 10/2005 |

*Primary Examiner* — David B Jones
(74) *Attorney, Agent, or Firm* — Yagod Morris & Associates Ltd.

(57) ABSTRACT

The disclosure herein relates to methods used to facilitate the assembly of chain-links. In particular, the disclosure relates to using a coupling mechanism comprising at least one coupling pin and at least one coupling socket to form a chain element in various ornamental and decorative forms. Accordingly, the coupling socket of a chain-link element is configured to accommodate a pin-head associated with the coupling pin in a pin-bed associated with the coupling socket. Furthermore, the coupling mechanism comprising a locking mechanism configured to fasten the pin-head into its associated pin-bed. Thus, the disclosed coupling mechanism provides an alternative to using soldering technique in the chain making field, enabling to assemble chain-link elements, especially of jewelry chains, which are typically made of precious metals, mainly gold and silver.

14 Claims, 15 Drawing Sheets

(56) References Cited

U.S. PATENT DOCUMENTS

| | | | | |
|---|---|---|---|---|
| 4,597,747 A * | 7/1986 | Lapeyre | ............... | B65G 17/08 198/853 |
| 4,815,270 A * | 3/1989 | Lapeyre | ............... | B65G 17/08 198/853 |
| 4,882,901 A * | 11/1989 | Lapeyre | ............... | B65G 17/08 198/853 |
| 6,158,575 A * | 12/2000 | Hitz | ............... | B65G 17/326 198/803.1 |
| 6,272,836 B1 * | 8/2001 | Fat | ............... | A44C 5/107 59/80 |
| 6,443,795 B1 * | 9/2002 | Lin | ............... | A63H 31/06 403/103 |
| 6,473,945 B1 * | 11/2002 | Draper | ............... | F16L 23/06 24/270 |
| 7,314,132 B2 * | 1/2008 | Layne | ............... | B65G 17/40 198/850 |
| 7,607,320 B2 * | 10/2009 | Perle | ............... | A44C 13/00 59/85 |

* cited by examiner

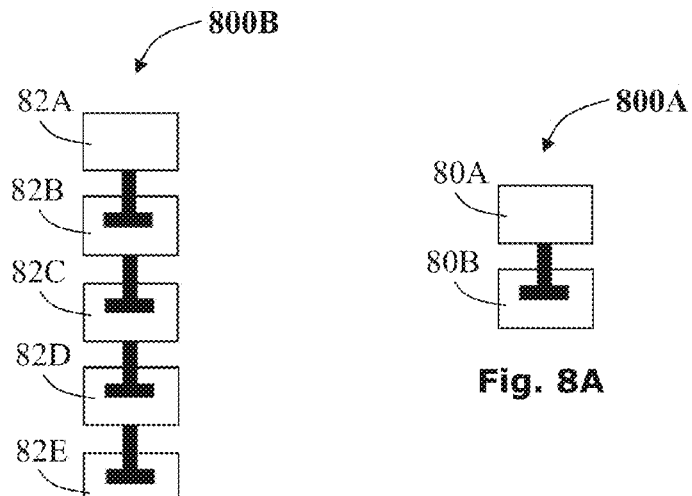
Fig. 8A
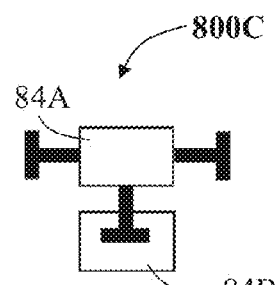
Fig. 8B
Fig. 8C
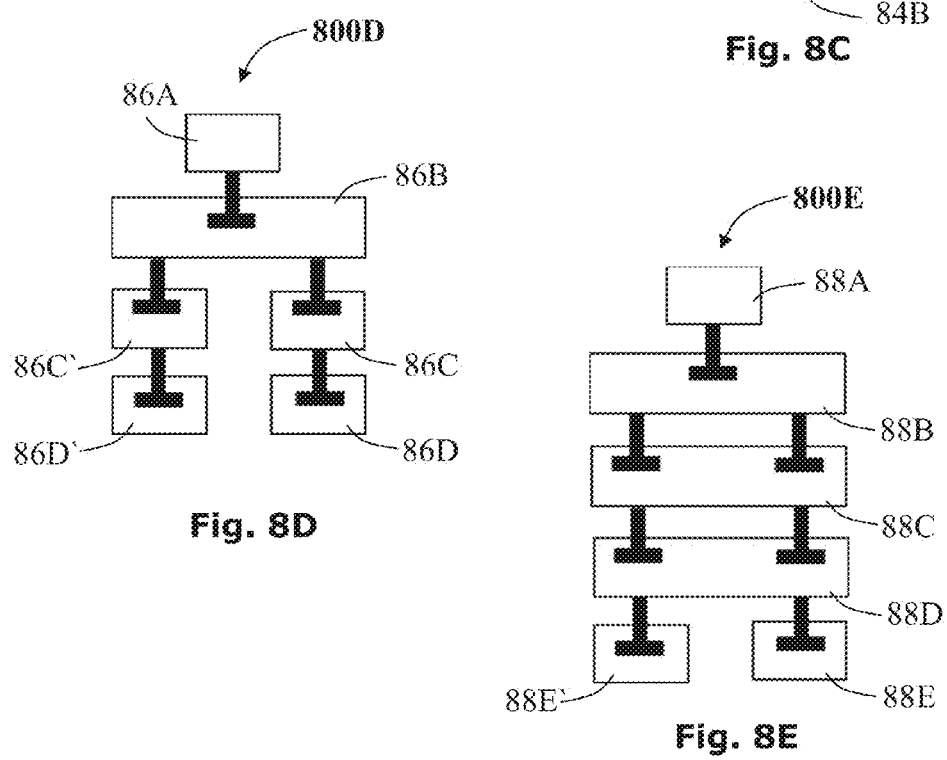
Fig. 8D
Fig. 8E

SYSTEM AND METHODS FOR ASSEMBLING CHAIN ELEMENTS USING A COUPLING MECHANISM

CROSS-REFERENCE TO RELATED APPLICATIONS

This application claims the benefit of priority from U.S. Provisional Patent Application No. 62/096,567, filed Dec. 24, 2014, the contents of which are incorporated by reference in their entirety.

FIELD OF THE INVENTION

The disclosure herein relates to system and methods used to facilitate the assembly of chain-links. In particular, the disclosure relates to using a coupling mechanism comprising at least one coupling pin and at least one coupling socket to form a chain element in various ornamental and decorative forms, with no need of using soldering techniques.

BACKGROUND OF THE INVENTION

A chain comprising a series of objects connected one after the other, usually in form of a series of metal rings passing through one another, are used for various purposes requiring a flexible tie with high tensile strength but also in various ornamental and decorative forms. Jewelry chains are typically made from precious metals, mainly gold and silver, but other materials may be used such as platinum, brass, nickel, palladium and steel. These metals are used because they are not very reactive, keep shape and strength, and require minimal maintenance to keep their shine. Small lever mechanisms such as findings or the like may serve as fastenings to enable wearing the chain.

Jewelry making is complex, in general, combining design and various technology aspects such as molding, casting, filing, polishing, decorative processes, plating, finishing, quality checking and the like. In particular, metal fabrication and soldering is a common operation performed in the jewelry industry, especially with regard to chain making.

Soldering, the art of permanently joining metal components with a torch and solder is considered as a challenge by many crafters, as a technique requiring tools and materials combined with professional and technical knowledge and regarded as a skill that takes years of dedication.

Soldering of the chain joints is generally performed using a hand-held butane torch. The use of a butane torch generates electrochemical hydrogen-oxygen flame, which is the main agent for soldering the parent metals. The main problems of the conventional soldering are galvanic corrosion, low biocompatibility, and low mechanical strength because of brazing gaps. Furthermore, porosities resulting from deficient filling of the solder gap and corrosion properties confirm the need for alternative joining techniques. Moreover, the assembly of any linked jewelry is a long and tedious process, requiring skilled professionals.

It will be appreciated that there is therefore a need for an improved chain making which may overcome the need for complex or skilled work such as soldering and the like. The present disclosure addresses this need.

SUMMARY OF THE INVENTION

According to various embodiments of the currently disclosed subject matter, a chain-link is introduced which is configured to connect with at least one mating chain-link to form a chain element, the chain-link comprising: a shaped-body having a longitudinal axis, a lateral axis and a vertical axis; at least one coupling-pin comprising a shank protruding distally from the shaped-body; and a pin-head extending from the distal end of the shank and including two lateral faces; at least one coupling-socket, comprising: a pin-bed within the shaped-body, the pin-bed configured to accommodate a mating pin-head associated with the mating chain link; and a coupling-slot extending through the shaped-body along a vertical axis traversing the pin-bed at an angle and configured to enable introduction of the mating pin-head into the pin-bed; and a locking mechanism configurable to secure the mating pin-head associated with the mating chain-link, within the pin-bed associated with the chain link; wherein the locking mechanism is configurable to secure the pin-head associated with the first link-element within the pin-bed associated with the second link-element.

As appropriate, the locking mechanism of the chain-link comprises at least one molded locking strip configured to prevent the mating pin-head to move out of the pin-bed.

Variously, the chain element is selected from a group comprising a necklace, a necklet, a bracelet, an armlet, a strap, a strip, a ribbon, a band, an earring, an anklet, a chain extender and combinations thereof.

Variously, the shaped-body is made of material selected from a group of gold, silver, steel, aluminum, copper, brass, nickel, rhodium, platinum, palladium, copper or combinations thereof.

As appropriate, the pin-bed comprising: a first depression and a second depression; wherein the first depression and the second depression form two support shelves configured to support the pin-head.

As appropriate, the shank having a shank-length measured along the longitudinal axis and a shank-width measured along the lateral axis; and the pin-head having a head-thickness measured along the vertical axis and a head-width measured along the lateral axis from the first lateral face to the second lateral face, the head-width being greater than the shank-width.

As appropriate, the coupling-slot having a slot-length measured along the longitudinal axis and a slot-width measured along the lateral axis, wherein the slot-length is larger than the head-width and the slot-width is larger than the head-thickness but smaller than the head-width.

As appropriate, wherein the first depression having a first-shoulder-length measured along the lateral axis; and the second depression having a second-shoulder-length measured along the lateral axis; wherein the first-shoulder-length and said second-shoulder-length is larger than said head-thickness.

As appropriate, wherein the pin-bed having a pin-bed-length measured along the longitudinal axis and a pin-bed-width measured along the lateral axis; wherein, the pin-bed-length is shorter than the shank-length, and said pin-bed-width is larger than the shank-width.

According to another aspect of the disclosure, a chain coupling mechanism is introduced, configured to connect a first link-element with a second link-element, the chain coupling mechanism, comprising: at least one coupling pin comprising a shank protruding distally from the first link-element; and a pin-head extending from the distal end of the shank and including two lateral faces; and at least one coupling socket within the second link-element, comprising: a pin-bed configured to accommodate the pin-head associated with the first link-element; a coupling-slot extending vertically through the second link-element traversing the pin-bed at angle and configured to enable introduction of the pin-head associated with the first link-element in the pin-bed; and a locking mechanism; wherein the locking mechanism is configurable to secure the pin-head associated with the first link-element within the pin-bed associated with the second link-element.

According to yet another aspect of the disclosure, a chain coupling mechanism is introduced configured to connect a first link-element with at least one second link-element, the chain coupling mechanism, comprising at least one of a coupling pin and a coupling socket, the coupling pin comprising a shank protruding distally from the first link-element; and a pin-head extending from the distal end of the shank and including two lateral faces; wherein the coulping pin is configured to be introduced into at least one coupling socket via a coupling-slot extending vertically through the second link-element and such that the pin-head associated with the first link-element is accommodated by a pin-bed within the second link-element, the pin-bed configured to accommodate the pin-head; and the coupling socket, comprising: a pin-bed within the second link-element, the pin-bed configured to accommodate a pin-head associated with the first link-element; and a coupling-slot extending vertically through the second link-element traversing the pin-bed at an angle and configured to enable introduction of a coupling pin associated with the first link-element; and a locking mechanism; wherein the locking mechanism is configurable to secure the pin-head associated with the first link-element within the pin-bed associated with the second link-element.

Optionally, the chain coupling mechanism comprises only the coupling pin.

Optionally, the chain coupling mechanism comprises only the coupling socket.

Optionally, the chain coupling mechanism comprises a plurality of the coupling pins.

Optionally, the chain coupling mechanism comprises a plurality of the coupling sockets.

BRIEF DESCRIPTION OF THE DRAWINGS

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings:

FIGS. 8A-E are schematic illustrations of various chain-link couplings of chain element segments, according to the presently disclosed subject matter;

DETAILED DESCRIPTION

Figure 1A:
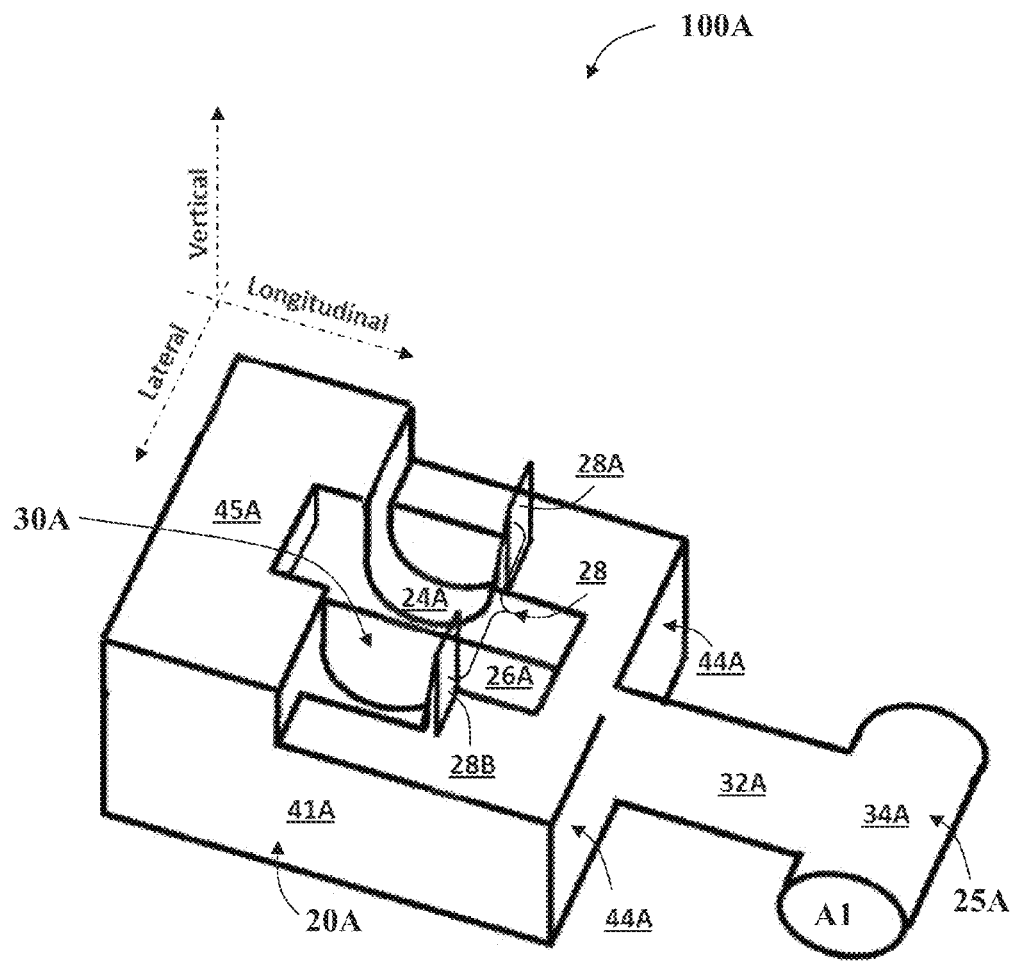
FIGS. 1A-C represent schematic illustrations of a chain-link element configured to form a chain element with a mating chain-link element according to the presently disclosed subject matter.

It is noted that the systems and methods of the invention herein may not be limited in their application to the details of construction and the arrangement of the components or methods set forth in the description or illustrated in the drawings and examples. The systems and methods of the invention may be capable of other embodiments or of being practiced or carried out in various ways.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

Jewelry chains are typically made from precious metals, mainly gold and silver. Other materials, such as brass, nickel, platinum, palladium and steel may also be used. These metals are used because they are not very reactive, keep shape and strength, and require only minimal maintenance to keep their shine. Small lever mechanisms called findings may serve as fastenings, and are the parts used to join jewelry components to together to form a completed article. Findings may include various fasteners such as ear wires used to link an earring to the wearer's ear, clasps to complete necklaces and bracelets, bails used to attach a pendant, stones or medallions.

As described in the embodiments hereinafter, a coupling mechanism comprising at least one coupling pin and at least one coupling socket may provide an alternative to soldering technique to assemble chain-link elements to form various types of chain elements.

Figure 1B:
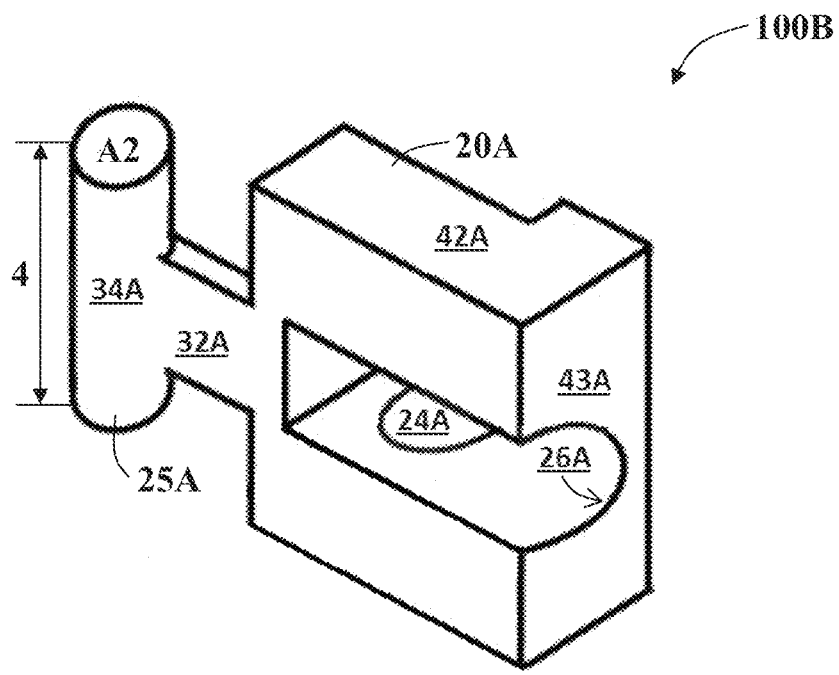
Figure 1C:
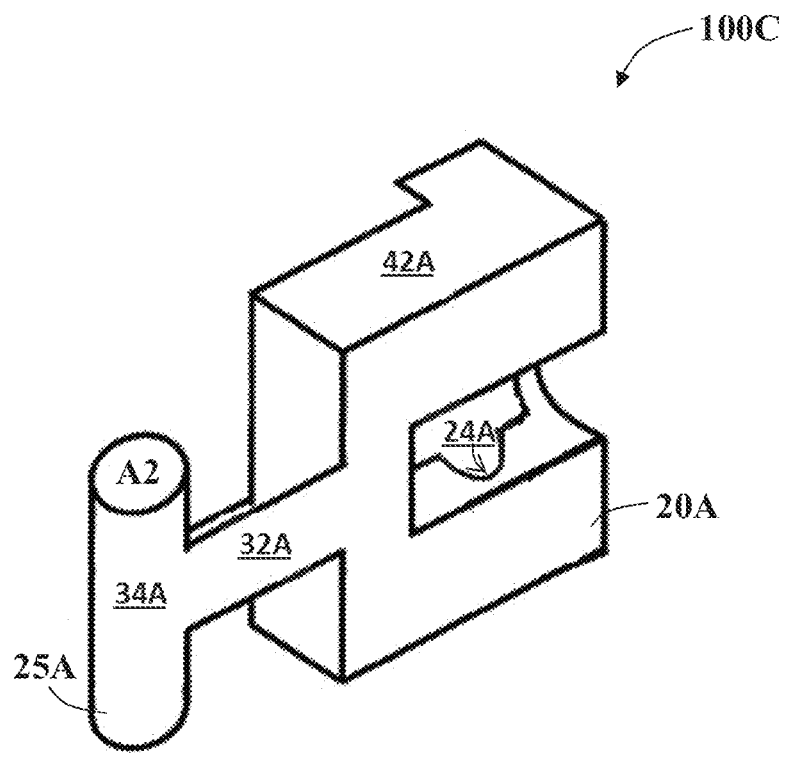

Detailed Embodiments:

The schematic illustrations, as represented in FIGS. 1A-C, provide various views of a chain-link element connectable with a mating chain-link to form a chain element comprising at least two chain-links. Each such chain-link element comprises a coupling pin and a coupling socket. The coupling socket of a chain-link element is configured to accommodate a pin-head associated with the coupling pin in a pin-bed associated with the coupling socket, thus, avoiding any need for soldering techniques.

Reference is now made to FIG. 1A, there is provided a schematic illustration of a chain-link element, which is generally indicated at 100A, configured to form a chain element, if connected with a mating chain-link element. The chain-link element 100A, comprising a coupling pin and a coupling socket, and is designed such that it may couple with a mating chain-link, according to the presently disclosed subject matter.

Optionally, the mating chain-link comprises at least one coupling pin 25A and at least one coupling socket 30A. Thus, coupling of the chain-link with a mating chain-link is enabled by introducing the coupling pin of the chain-link through a coupling-slot associated with the coupling socket of the mating chain-link, such that the pin-head is accommodated into a pin-bed of coupling socket.

It is noted that for the example mentioned hereinabove, the coupling is operable in reverse order, that is, introducing the coupling pin of the mating chain-link through a coupling-slot associated with the coupling socket of the chain-link.

Optionally, the mating chain-link comprises at least one coupling pin only. Thus, the coupling is operable in by introducing the coupling pin of the mating chain-link through a coupling-slot associated with the coupling socket of the chain-link.

Optionally, the mating chain-link comprises at least one coupling socket only. Thus, the coupling is operable in by introducing the coupling pin of the chain-link through a coupling-slot associated with the coupling socket of the mating chain-link.

Additionally, the mating chain-link further comprises at least one ornamental element or various hooking elements.

Referring to the embodiment of FIGS. 1A-C, the chain-link element 100A includes a distally extending coupling pin 25A and a coupling socket 30A within the link shaped body of the chain-link element, thus enabling accommodation of a mating coupling pin of another chain-link.

The coupling pin 25A extends distally from the chain-link element 100A shaped body, along a longitudinal axis. The coupling pin 25A comprises a shank 32A and a pin-head 34A. The shank 32A has a shank-length (dimension 1, FIG. 2) measured along the longitudinal axis and a shank-width (dimension 2, FIG. 2) measured along the lateral axis. The pin-head 34A, having a circular cross section, extending from the distal end of the shank 32A and including two lateral faces "A1" (see FIG. 1A) and "A2" (see FIG. 1B). The pin-head 34A has a pin-head thickness (dimension 3, FIG. 2) of a round cross section and a pin-head width (dimension 4, FIG. 2) measured along the lateral axis from the first lateral face "A1" to the second lateral face "A2".

The coupling socket 30A comprising a pin-bed 24A configured to accommodate the pin-head 34A of a mating chain-link element and a coupling-slot 26A. The coupling-slot 26A extends vertically through the shaped body of the chain-link element 100A, traversing the pin-bed 24A at angle and configured to enable introduction of the pin-head 34A associated with the mating chain-link element into the pin-bed 24A of the chain-link element.

It is noted that the insertion-slot 26A has a slot-length (dimension 5, FIG. 2) measured along the longitudinal axis and a slot-width (dimension 6, FIG. 2) measured along the lateral axis.

The pin-bed 24A may include a first depression (item 24.1, FIG. 3B) and a second depression (item 24.2, FIG. 3B) forming two support shelves configured to hold the pin-head 34A. The support shelves, 24.1 and 24.2 may have a support length recess along a pin-bed-shoulder (dimension 10, FIG. 2) measured along the lateral axis.

It is noted that the current embodiment represent a symmetrical chain-link, including two pin-bed shoulders of identical size. Various other embodiments may present asymmetrical chain-links, having different pin-bed shoulder sizes Furthermore, current embodiment 100A represents a chain-link element with a specific geometry of a shaped body, as illustrated in FIG. 1A. Such shaped body is illustrated by way of example only, and should not be interpreted as necessarily limiting.

The chain-link element body 100A may comprise a first sidewall 41A, a second sidewall 42A (shown in FIG. 3A), a back wall 43A (shown in FIG. 1B), a front wall 44A and a cross-bridge 45A. Accordingly, the first sidewall 41A extends along a longitudinal axis, the second sidewall 42A is extends along the longitudinal axis laterally apart from the first sidewall 41A, the back wall 43A extends along a lateral axis between the first wall 41A and the second wall 42A, the front wall 44A extends along a lateral axis longitudinally apart from the back wall 43A and the cross-bridge 45A extends laterally from the first sidewall 41A to the second sidewall 42A.

Accordingly, the chain-link element body 100A may comprise a locking mechanism 28 operable to secure a mating pin-head introduced into the pin-bed 24A. The locking mechanism may comprise two locking strips 28A and 28B arranged laterally as illustrated in FIG. 1A. Such arrangement is illustrated by way of example only, and should not be interpreted as necessarily limiting.

It should be appreciated that various embodiments may use a single locking strips or different arrangements. For example, a locking strip may be molded longitudinally, at the edge of a coupling slot as another option, as shown hereinafter in FIG. 4A and FIG. 4B.

It is particularly noted that:

(1) the slot-length (dimension 5, FIG. 2) is larger than the head-width (dimension 4, FIG. 2) of the pin-head 34A and the slot-width (dimension 6, FIG. 2) is larger than the pin-head thickness (dimension 3, FIG. 2) but smaller than the pin-head width of (dimension 4, FIG. 2) the pin-head 34A.

Figure 2:
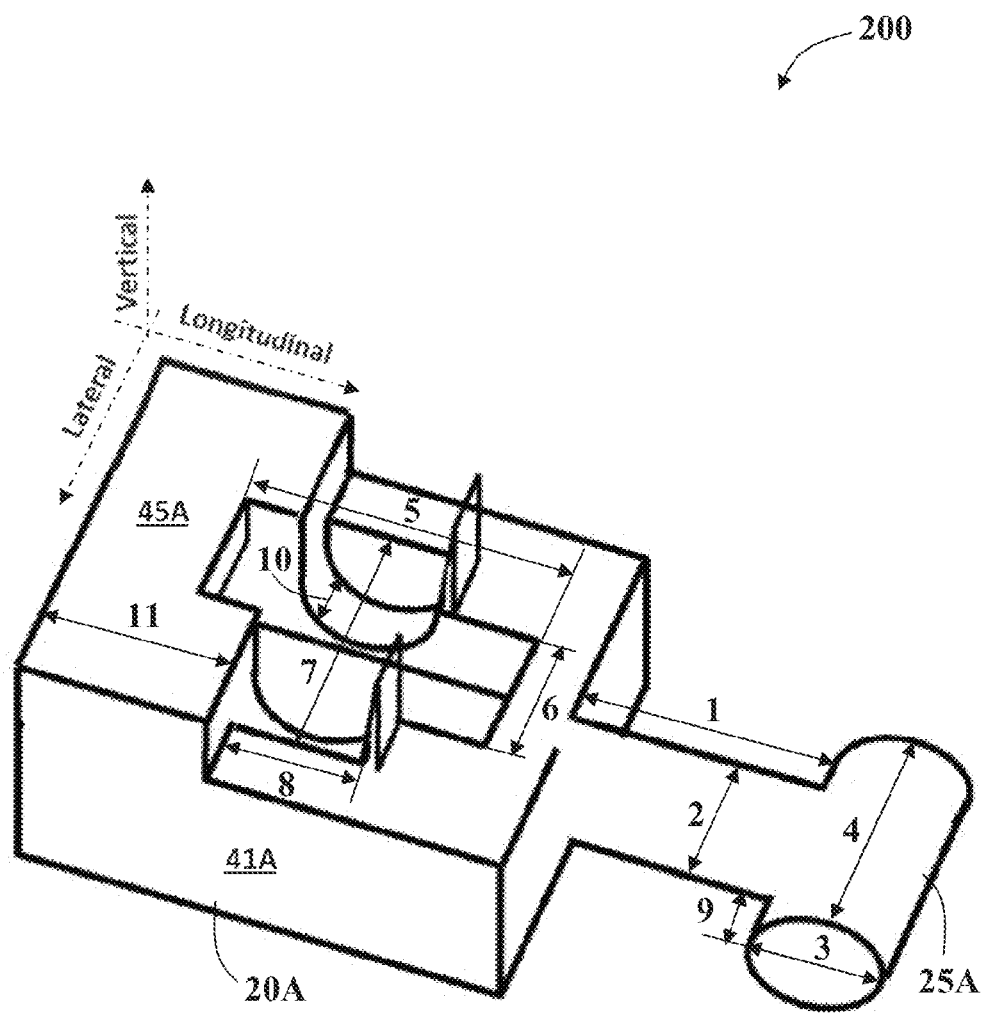
FIG. 2 is a schematic illustration of a chain-link element providing the exemplified chain-link dimensions according to the presently disclosed subject matter.

(2) the pin-bed length (dimension 7, FIG. 2) is shorter than the shank-length (dimension 1, FIG. 2), and the pin-bed width (dimension 8, FIG. 2) is larger than the shank-width (dimension 2, FIG. 2).

(3) the pin-head width (dimension 4, FIG. 2) is greater than the shank-width (dimension 2, FIG. 2), as indicated by dimension 9 of FIG. 2.

As illustrated in FIG. 1B, there is provided a schematic illustration of a chain link element view, which is generally indicated at 100B and is rotated at an angle compared to the view of the schematic illustration of FIG. 1A. FIG. 1C further illustrates yet another view of a chain link element, which is generally indicated at 100C and is further rotated at another angle, to show all associated aspects of the chain link.

Figure 3A:
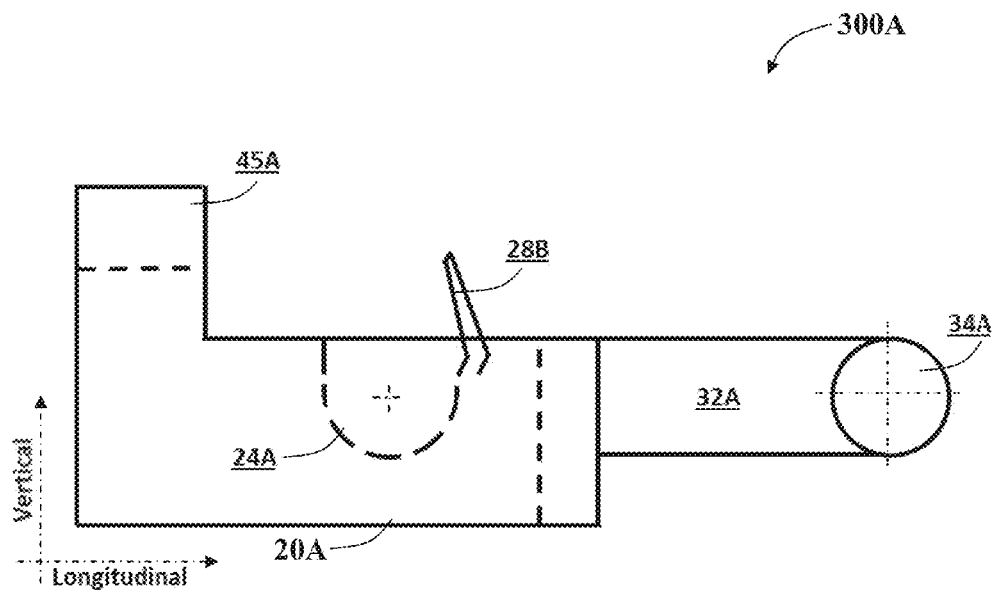
FIG. 3A is a schematic top-view illustration of a possible chain-link element along a longitudinal axis including the locking mechanism, according to the presently disclosed subject matter.

Dimensions & Measurements:

Reference is now made to FIG. 2, there is provided a schematic illustration of an exemplified chain-link element dimensions, which is generally indicated at 200, according to the presently disclosed subject matter.

dimension 1: a shank-length of the shank (item 32A, FIG. 1A) measured along the longitudinal axis;

dimension 2: shank-width of the shank (item 32A, FIG. 1A) measured along the lateral axis;

dimension 3: pin-head thickness of the pin-head (item 30A, FIG. 1A) measured along the lateral axis;

dimension 4: pin-head width is the width of the pin-head (item 30A, FIG. 1A) measured along the lateral axis;

dimension 5: slot-length is the length of the coupling-slot (item 26A, FIG. 1A) measured along the longitudinal axis;

dimension 6: slot-width is the width of the coupling-slot (item 26A, FIG. 1A) measured along the lateral axis;

dimension 7: pin-bed length is the length of the pin-bed (item 24A, FIG. 1A) measured along the lateral axis;

dimension 8: pin-bed width is the width of the pin-bed (item 24A, FIG. 1A) measured along the longitudinal axis;

dimension 9: indicates the difference between the head-width of the pin-head (item 30A, FIG. 1A) and shank-width of the shank (item 32A, FIG. 1A) measured along the lateral axis;

dimension 10: pin-bed-shoulder is the width of the pin-bed shoulder (item 24A, FIG. 1A) measured along the lateral axis;

dimension 11: pin-bed-offset is the offset distance of the pin-bed (item 24A, FIG. 1A) measured along the longitudinal axis;

Mating & Locking:

Reference is now made to FIG. 3A, there is provided a schematic illustration side view of a possible chain-link element along the longitudinal axis, which is generally indicated at 300A, according to the presently disclosed subject matter.

The schematic illustration side view 300A of the chain-link element 20A includes the shank 32A of the coupling-pin protruding distally from the chain-link shaped body, the pin-head 34A extending from the distal end of the shank 32A showing the associated lateral face A1 of the pin-head, the pin-bed 24A cross-section associated with the coupling socket, configured to accommodate a mating pin-head associated with a mating chain-link and the strip 28B associated with the pin-head 34A locking mechanism.

Figure 3B:
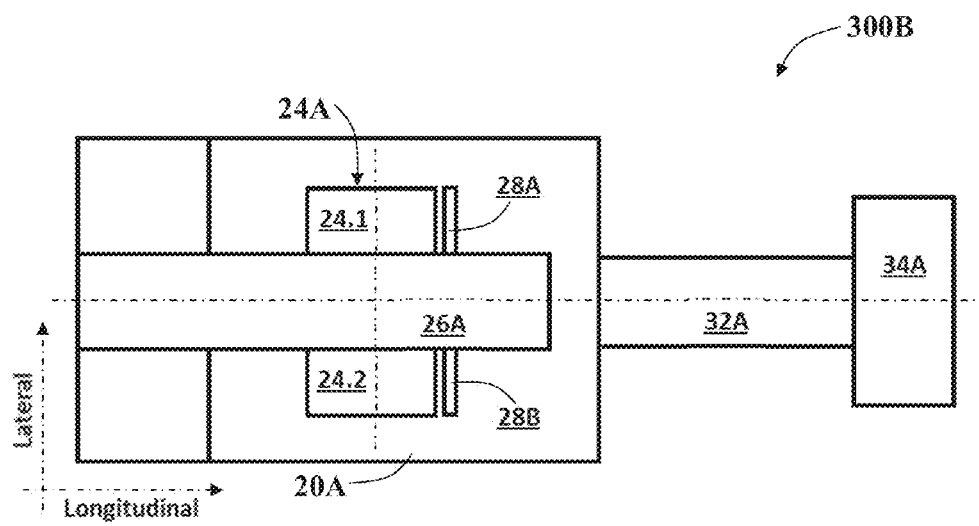
FIG. 3B is a schematic side-view illustration of a possible chain-link element along a longitudinal axis including the locking mechanism, according to the presently disclosed subject matter.

Reference is now made to FIG. 3B, there is provided a schematic illustration top view of a possible chain-link element along the longitudinal axis, which is generally indicated at 300B, according to the presently disclosed subject matter.

The schematic illustration top view 300B of the chain-link element 20A includes the shank 32A of the coupling-pin protruding distally from the chain-link shaped body, the pin-head 34A extending from the distal end of the shank 32A, the coupling socket top view comprising the pin-bed 24A top view associated with the coupling socket, configured to accommodate a mating pin-head associated with a mating chain link, the coupling-slot 26A extending through the chain-link shaped body along a vertical axis at an angle (90 degrees, for example) to the pin-bed 24A and configured to enable introduction of a mating pin-head into the pin-bed 24A. The schematic illustration top view 300B further comprises two strips 28A and 28B of the locking mechanism configured to lock the pin-head 34A in its associated pin-bed of the coupling socket.

Where appropriate, the locking strips 28A and 28B may extend from the body of the chain-link element 20A such that, when a mating pin-head 34A is accommodated by the pin-bed 24A, the locking strips 28A and 28B may be folded down to secure the pin-head 34A in place.

Figure 3C:
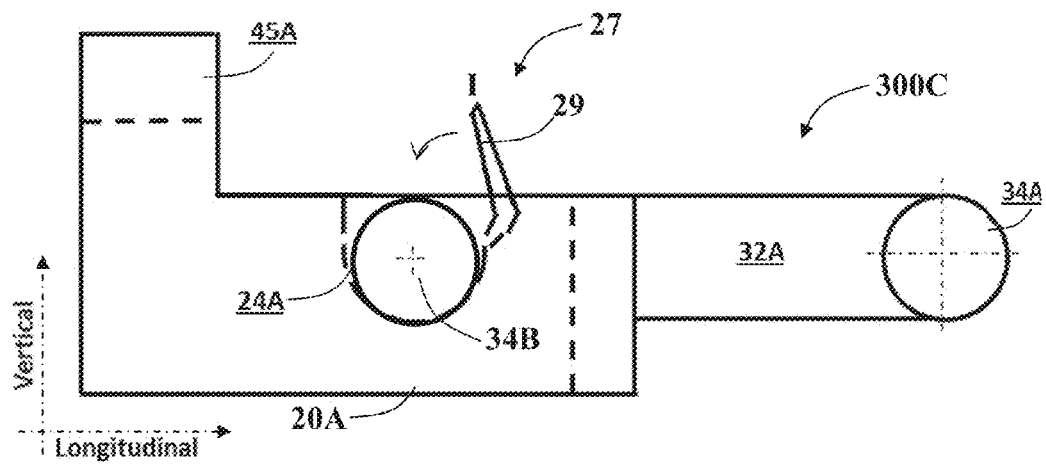
FIGS. 3C and 3D are schematic side-view illustrations of one possible example of the chain-link element locking mechanism in open and closed configurations, according to the presently disclosed subject matter.
Figure 3D:
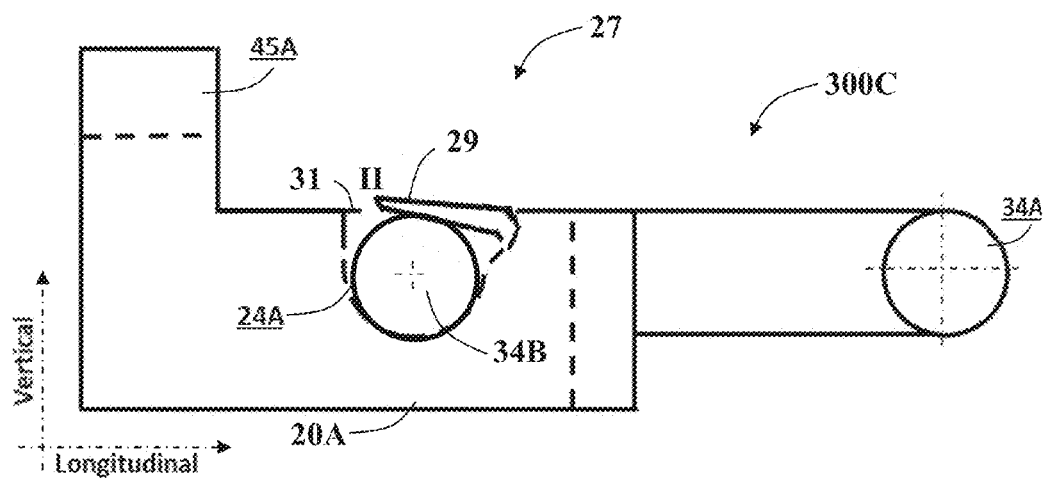

Reference is now made to FIGS. 3C and 3D, there is provided a schematic illustration of a possible locking mechanism 27 for a chain-link element, which is generally indicated at 300C, according to the presently disclosed subject matter. FIG. 3C schematically represents the locking mechanism 27 in an open configuration I and FIG. 3D schematically represents the locking mechanism 27 in an closed configuration II.

The schematic illustration 300C of the chain-link locking mechanism 27 includes the shaped body 20A, the pin-bed 24A operable to support a pin-head 34B of a mating chain-link (not shown) and a locking strip 29 of the locking mechanism 27.

Figure 5A:
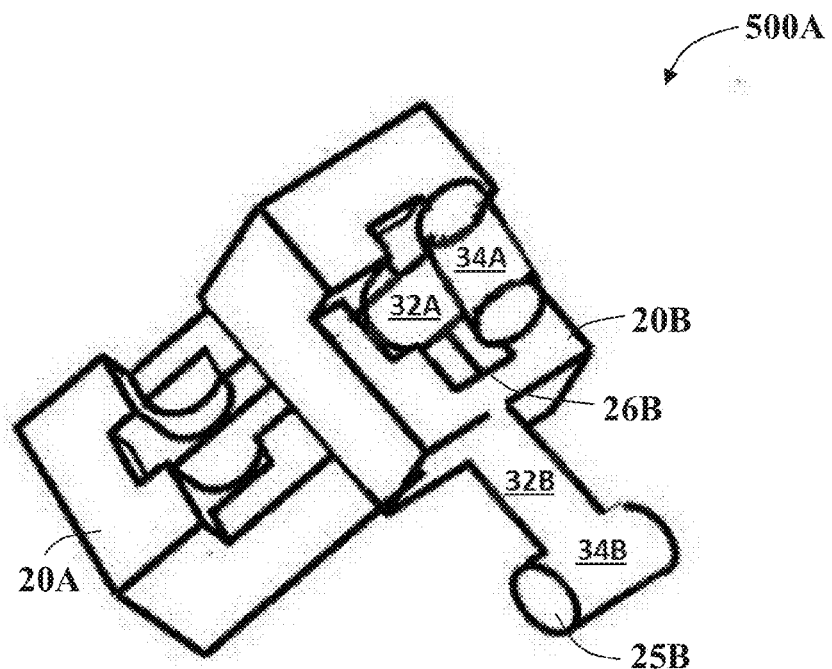
FIG. 5A is a schematic illustration of introducing a chain-link element with a mating chain-link element to form a chain element, according to the presently disclosed subject matter.

FIG. 3C shows the locking mechanism 27 in its open configuration I. In the open configuration I the locking strip 29 extends from the body 20A of the chain link 300C such that it does not impede the movement of the mating pin-head 34B when it is inserted through the coupling slot 26B during coupling such as shown in FIG. 5A hereinbelow.

FIG. 3D shows the locking mechanism 27 in its closed configuration II. The closed configuration II is used to secure the mating pin-head 34B into place once it has been docked into the pin-bed 24A of the chain link 300C. This may be achieved, for example, by folding the locking strip 29 over the mating pin-head 34B so as to restrict movement of the pin-head 34B out of the pin-bed 24A. Where appropriate, a catch 31 may be provided to secure the locking strip 29 in place however it is noted that, in other embodiments, the locking strip 29 may be sufficient to hold the pin-head 34B without any catch 31.

Transition from the open configuration may be achieved by pressing or pushing the locking strip 29 over the mating pin-head 34A, either manually or using a suitable tool such as a plier, pincer, crimper, tongs, jaws or the like. It is particularly noted that the locking mechanism 27 may remain in its closed configuration II without the need for any soldering of the chain element 300A.

Figure 3E:
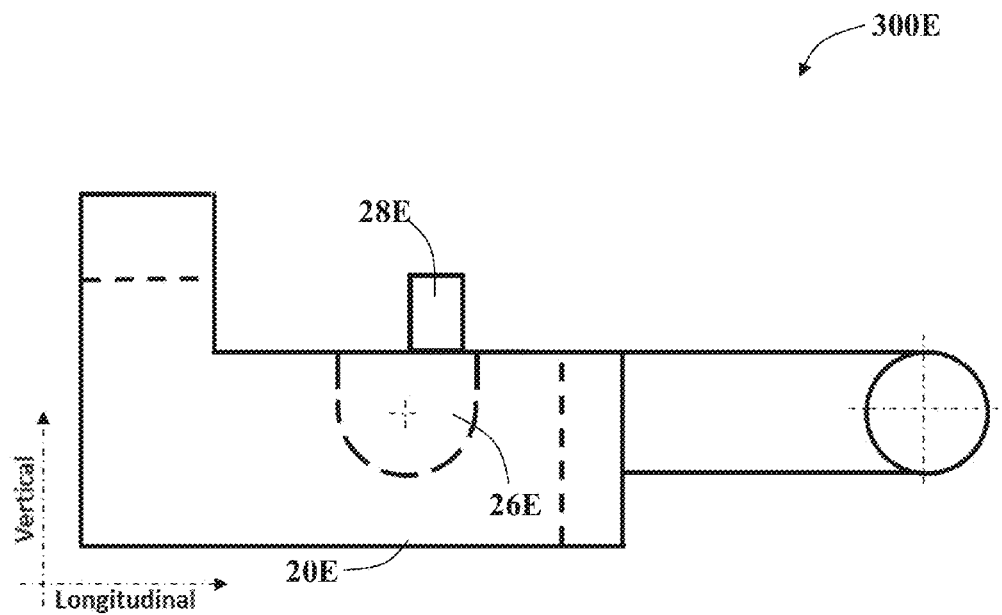
FIGS. 3E and 3F are schematic side-view and top-view illustrations of another possible example of the chain-link element locking mechanism, according to the presently disclosed subject matter.
Figure 3F:
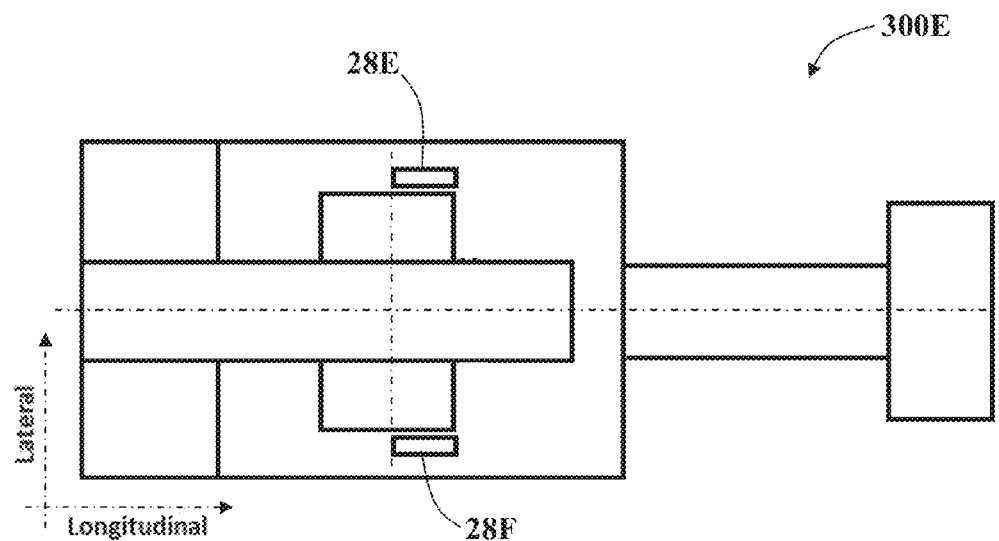

It will be appreciated that the locking mechanisms 27 presented in this descriptions are to be understood as non-limiting examples. Other locking mechanisms maybe used as appropriate. For example, still another example of a solder-free locking mechanism is represented in FIGS. 3E and 3F. FIG. 3E shows a side view, and FIG. 3F shows a top view of another example of the chain element 300E having two lateral locking strips 28E, 28F. The locking strips 28E, 28F are shown in their open configuration however they are configured to be folded over a mating pin-head (not shown) accommodated by the pin-bed 26E from either side of the body 20E. In view of these examples still other solder-free locking mechanisms will occur to those skilled in the art.

Figure 4A:
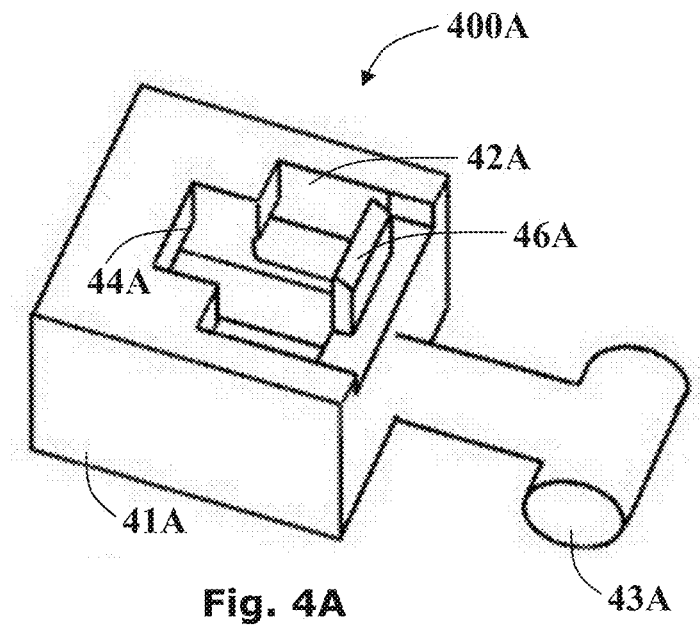
FIG. 4A is a schematic illustration of one possible configuration of the chain-link element locking mechanism having a single long locking strip, according to the presently disclosed subject matter.
Figure 4B:
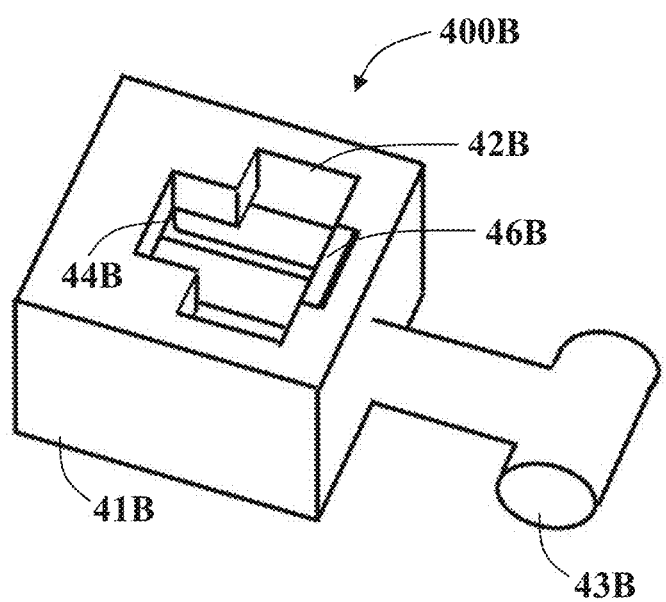
FIG. 4B is a schematic illustration of another possible configuration of the chain-link element locking mechanism having a single short locking strip, according to the presently disclosed subject matter.

It is noted that FIG. 4A and FIG. 4B, each showing different possible implementation of a single strip of a chain-link locking mechanism.

As illustrated in FIG. 4A, there is provided a schematic illustration of one possible configuration of the chain-link element locking mechanism, which is generally indicated at 400A, having a single long locking strip 46A, according to the presently disclosed subject matter.

As illustrated in FIG. 4B, there is provided a schematic illustration of another possible configuration of the chain-link element locking mechanism, which is generally indicated at 400B, having a single short locking strip 46B, according to the presently disclosed subject matter.

Assembling of a Chain Element:

Assembling of a chain element comprising a chain-link and a mating chain-link, for example, involves introducing of the pin-head (item 34A, FIG. 1A) of the chain-link through the coupling-slot (item 26A, FIG. 1A) associated with the coupling socket of the mating chain-link, turning the pin-head (item 34A, FIG. 1A) such that it can be accommodated within the pin-bed (item 24A, FIG. 1A) of the coupling socket of the mating chain link.

Reference is now made to FIG. 5A, there is provided a schematic illustration of introducing a chain-link element 20A with a mating chain-link element 20B to form a chain element, which is generally indicated at 500A, according to the presently disclosed subject matter. The assembly illustration 500A is showing an assembly of the chain link element 22A and the associated mating chain link element 22B brought together to form a chain element 450. Variously, the chain element may form various combinations such as a necklace, a necklet, a bracelet, an armlet, a strap, a band and combinations thereof.

Figure 5B:
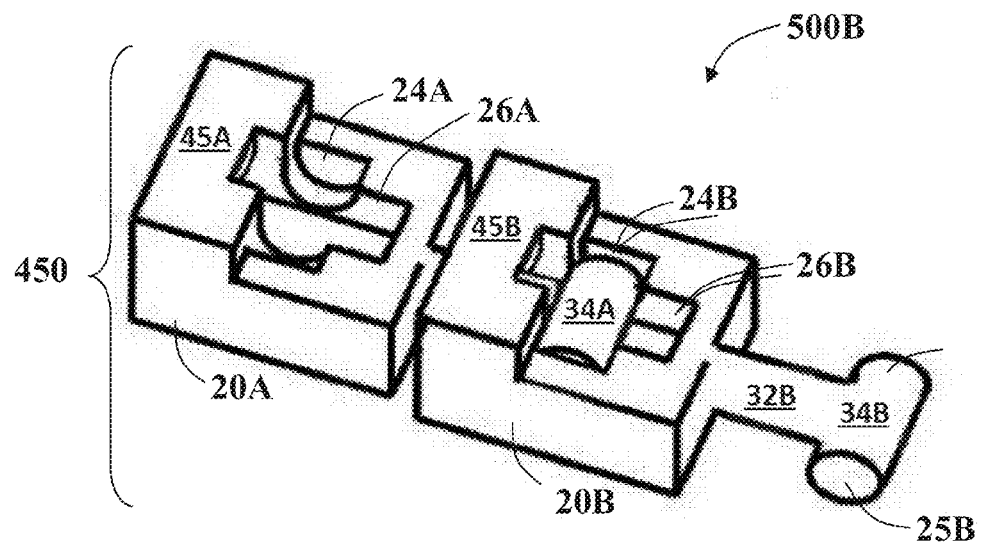
FIG. 5B is a schematic illustration of accommodating a chain-link element into a pin-bed of a mating chain-link element to form a chain element, according to the presently disclosed subject matter.

The assembly illustration includes a coupling pin comprising of a shank 32A and a pin-head 34A of a chain link 22A inserted via the coupling slot 26B of the chain link element 22B chain link element and operable to be rotated and accommodated into the associated socket of the mating chain link and then to locked in its position, as further described in FIG. 5B, thereafter.

Reference is now made to FIG. 5B, there is provided a schematic illustration of accommodating a chain-link element into a pin-bed of a mating chain-link element which is generally indicated at 500B, according to the presently disclosed subject matter. The schematic illustration 500B is provides two connectable chain-links in which the pin-head 34A associated with the chain-link 20A is accommodated into the coupling socket 24B associated with the mating chain-link 20B.

It is noted that the exemplified schematic illustrations 500A and 500B, represent by way of example, a coupling mechanism of two identical chain-links, in which each chain-link comprising a coupling pin and a coupling socket.

Variously, other coupling engagements of a chain-link and a mating chain-link operable to form a chain element 450 may exist, such as: a chain-link comprising a coupling pin and a coupling socket may couple with a mating chain-link, having a coupling pin only; a chain-link comprising a coupling pin and a coupling socket may couple with a mating chain-link, having a coupling socket only; a chain-link with a coupling pin only may couple with a mating chain-link, having a coupling socket only.

Figure 6:
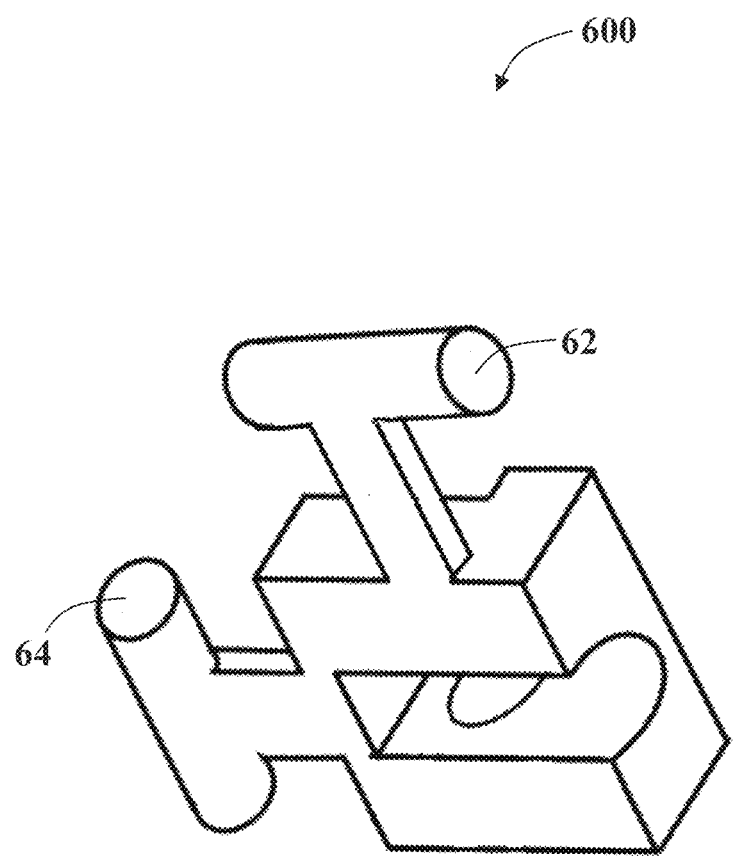
FIG. 6 is a schematic illustration of a chain-link element with two coupling pins configured to couple with two mating chain-link elements.

Reference is now made to FIG. 6, there is provided a schematic illustration of a chain-link element with two coupling pins, which is generally indicated at 600, according to the presently disclosed subject matter.

The chain link 600 comprises a first coupling pin 62 and a second coupling pin 64, as an exemplified option, configured to couple with two mating chain-link elements, thus enabling to form various chain elements.

Figure 7A:
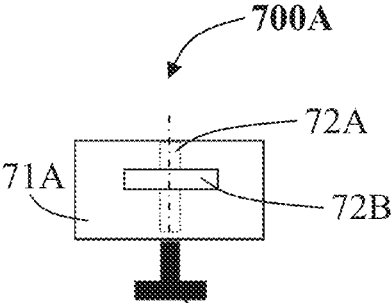
FIGS. 7A-D are schematic illustrations of various chain-links configured to couple with various mating chain-links to form a chain element, according to the presently disclosed subject matter.
Figure 7A:
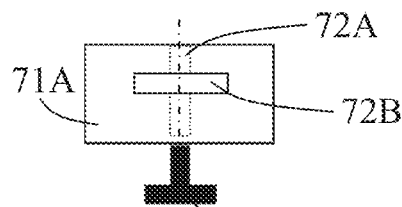
Figure 7B:
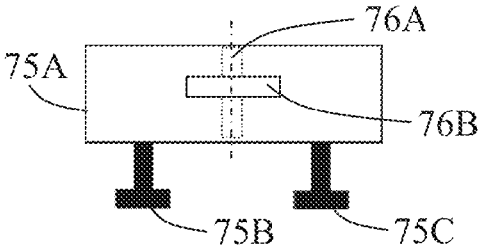

Optionally, a chain-link may include three coupling pins configured to form a "T" shaped chain element as may be illustrated in FIG. 7B.

Variously, additional possible chain elements examples may be possibly formed as may be illustrated in FIGS. 7A-D, enabling to form chain elements such as exemplified in FIGS. 8A-E.

Coupling Mechanism:

The schematic illustrations as represented in FIGS. 7A-D provide various chain-links configured to couple with a mating chain-link to form a chain element such as a necklace, a necklet, a bracelet, an armlet, a strap, a band, a strip, a ribbon and combinations thereof.

As illustrated, FIG. 7A there is provided an illustration of a chain-link, which is generally indicated at 700A, according to the presently disclosed subject matter.

The chain-link 700A comprises a shaped body 71A, a coupling pin 71B and a coupling socket comprising a coupling slot 72A and a pin-bed 72B configured to accommodate a coupling pin of various mating chain-links such as the currently presented in FIGS. 7A-D, for example.

As illustrated, FIG. 7B there is provided an illustration of a chain-link, which is generally indicated at 700B, according to the presently disclosed subject matter.

The chain-link 700B comprises a shaped body 73A, a first coupling pin 73B, a second coupling pin 73C, a third coupling pin 73D and a coupling socket comprising a coupling slot 74A and a pin-bed 74B configured to accommodate a coupling pin of various mating chain-links such as the currently presented in FIGS. 7A-D, for example.

Figure 7C:
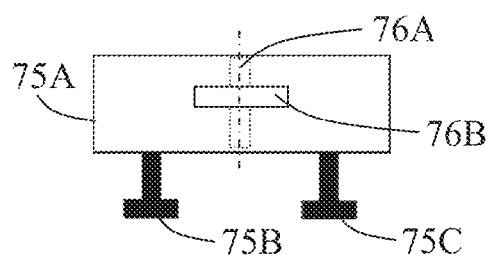

As illustrated, FIG. 7C there is provided an illustration of a chain-link, which is generally indicated at 700C, according to the presently disclosed subject matter.

The chain-link 700C comprises a shaped body 75A, a first coupling pin 75B, a second coupling pin 75C and a coupling socket comprising a coupling slot 76A and a pin-bed 76B configured to accommodate a coupling pin of various mating chain-links such as the currently presented in FIGS. 7A-D, for example.

Figure 7D:
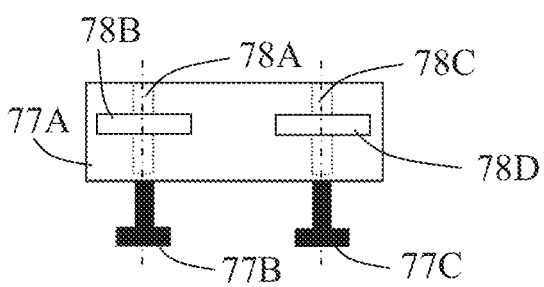
Figure 7D:
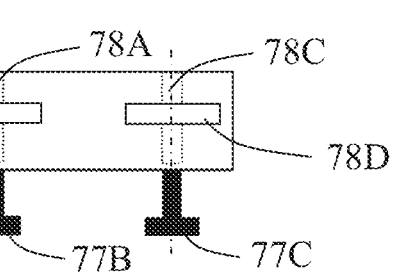

As illustrated, FIG. 7D there is provided an illustration of a chain-link, which is generally indicated at 700D, according to the presently disclosed subject matter.

The chain-link 700D comprises a shaped body 77A, a first coupling pin 77B, a second coupling pin 77C and a first coupling socket comprising a coupling slot 78A and a pin-bed 78B and a second coupling socket comprising a coupling slot 78C and a pin-bed 78D, in which the coupling sockets are each configured to accommodate a coupling pin of various mating chain-links such as the currently presented in FIGS. 7A-D, for example.

The schematic illustrations as represented in FIGS. 8A-E provide various segments of chain element assembled with of a number of chain-links.

A chain-link comprises a shaped body, at least one coupling pin and at least one coupling socket is configured to connect with at least one mating chain-link comprising at least one coupling socket and connectable by at least one other mating chain-link comprising at least one coupling pin.

A chain-link comprises a shaped body and at least one coupling pin only is configured to connect with at least one mating chain-link comprising at least one coupling socket but may not be connectable by other mating chain-link.

A chain-link comprises a shaped body and at least one coupling socket configured to be connected with at least one mating chain-link with at least one mating chain-link comprising at least one coupling pin, but may not be configured to connect other mating chain-link.

As illustrated, FIG. 8A there is provided an illustration of a chain-link coupling mechanism, which is generally indicated at 800A, according to the presently disclosed subject matter.

The chain-link coupling mechanism 800A comprises a first chain-link 80A comprising a first shaped body and a coupling pin; and a second chain-link 80B comprising a second shaped body and a coupling socket, in which the coupling socket is configured to accommodate the pin-head of the associated coupling pin in to the pin-bed of the associated coupling socket.

The first chain-link may be used as a jewelry finding, such as a clasp or an ear wire, used to join jewelry components together to form a completed article.

As illustrated, FIG. 8B there is provided an illustration of a segment of a chain-link element, which is generally indicated at 800B, according to the presently disclosed subject matter.

The segment of a chain-link element 800B comprising a first chain-link 82A comprising a coupling pin only, a second chain-link 82B, a third chain-link 82C, a fourth chain-link 82D each comprising a coupling pin and a coupling socket and a fifth chain-link 82E comprising a coupling socket only.

Optionally, the first chain-link 82A may further comprise a coupling socket enabling the chain-link to couple with an additional mating chain-link or with a pendant, locket or medallion, for example, comprising a mating coupling pin.

Optionally, the fifth chain-link 82E may further comprise a coupling pin enabling the chain-link to couple with an additional mating chain-link or with a pendant, locket or medallion, for example, comprising a mating coupling socket.

As illustrated, FIG. 8C there is provided an illustration of a "T" shaped coupling mechanism, which is generally indicated at 800C, according to the presently disclosed subject matter.

The "T" shaped coupling mechanism 800C comprising a "T" shaped chain-link 84A comprising three coupling pins arranged in a "T" and a mating chain-link 84B comprising a single coupling socket coupled with the middle coupling pin of the "T" shaped chain-link 84A, in which the pin-head is accommodated securely within the pin-bed of the coupling socket.

It is noted that such "T" shaped coupling mechanism enables the addition of an ornamental pendant, locket or a medallion to a necklace, for example, in which the ornamental element comprises the coupling socket to enable coupling with the chain-link element. Thus, such a "T" shaped coupling may serve as a bail, replacing the classic bail that allows the chain to pass through and in practice is connected by a ring to a pendant, a locket or a stone. Bails are a frequently pre-made component used on an otherwise handmade piece of jewelry.

As illustrated, FIG. 8D there is provided an illustration of a segment of another chain-link element, which is generally indicated at 800D, according to the presently disclosed subject matter.

The segment of a chain-link element 800D comprising a first chain-link 86A comprising a coupling pin only, a second chain-link 86B having a wider shaped body comprising a single coupling socket and two coupling pins, a third chain-link 86C and 86C' each comprising a coupling pin and a coupling socket and a fourth chain-link 86D and 86D'.

Optionally, the first chain-link 86A may further comprise a coupling socket enabling the chain-link to couple with an additional mating chain-link or with a pendant or medallion, for example, comprising a mating coupling pin.

Optionally, the fourth chain-links 86D and 86D' may each further comprise a coupling pin enabling the chain-links to couple with an additional mating chain-link comprising a mating coupling socket.

As illustrated, FIG. 8E there is provided an illustration of a segment of yet another chain-link element, which is generally indicated at 800E, according to the presently disclosed subject matter.

The segment of the chain-link element 800E comprising a first chain-link 88A comprising a coupling pin only, a second chain-link 88B having a wider shaped body comprising a single coupling socket and two coupling pins, a third chain-link 88C and a fourth chain-link 88D, each comprising a wider shaped body and coupling pins and two coupling sockets and a fifth chain-link 88E and 88E', each comprising a coupling socket only.

Optionally, the first chain-link 88A may further comprise a coupling socket enabling the chain-link to couple with an additional mating chain-link or with a pendant or medallion, for example, comprising a mating coupling pin.

Optionally, the fifth chain-links 88E and 88E' may each further comprise a coupling pin enabling the chain-links to couple with an additional mating chain-link comprising a mating coupling socket.

Figure 9:
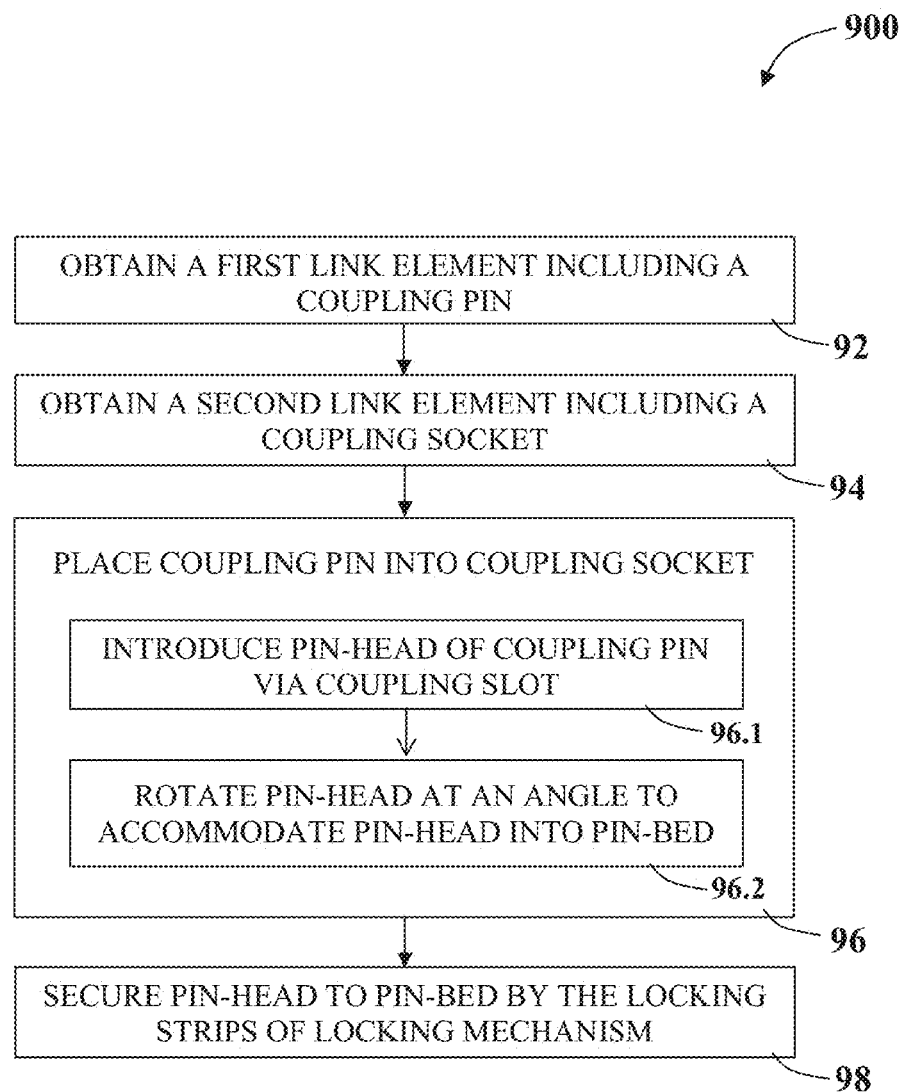
FIG. 9 is a flowchart representing a method for coupling a chain-link element with a mating chain-link, according to the presently disclosed subject matter.

Coupling Formation:

Reference is now made to the flowchart of FIG. 9, there is provided a method, which is generally indicated at 900, for coupling of a chain-link element and a mating chain-link element by using a coupling mechanism. The coupling mechanism comprising of a coupling pin associated with the chain-link element and a coupling socket may be associated with the mating chain-link element.

The method 900 includes providing a first link-element (the chain-link) comprising a coupling pin—step 92, in which the coupling pin comprising a shank protruding distally from the first link-element and a pin-head extending from the distal end of the shank and including two lateral faces; providing a second link-element (the mating chain-link) comprising a coupling socket comprising a pin-bed and a coupling socket—step 94, in which the pin-bed configured to accommodate the pin-head associated with the first link-element and the coupling-slot extending vertically through the second link-element traversing the pin-bed at angle and configured to enable introduction of the pin-head associated with the first link element in the pin-bed; placing the coupling into associated with the first link-element into the coupling socket associated with the second link-element—step 96, thus forming a coupling mechanism. The step of forming the coupling mechanism further includes introducing the pin-head of the coupling pin via the coupling slot associated with the second link-element—step 96.1; and turning the pin-head of the coupling pin, at an angle, such as to enable accommodating the pin-head associated with the first chain-link into the pin-head associated with the second link-element—step 96.2; and securing the pin-head associated with the first link element into the pin-bed associated with the second link-element, using the strips of the locking mechanism—step 98.

Figure 10A:
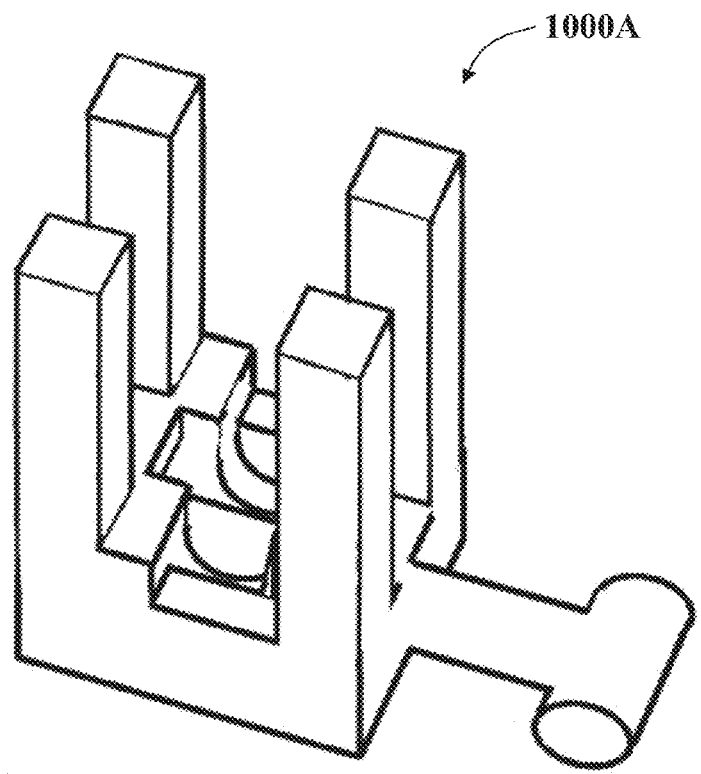
FIG. 10A is a schematic illustration of a chain-link element design option including four claws, as a possible usage of the currently disclosed subject matter.
Figure 10B:
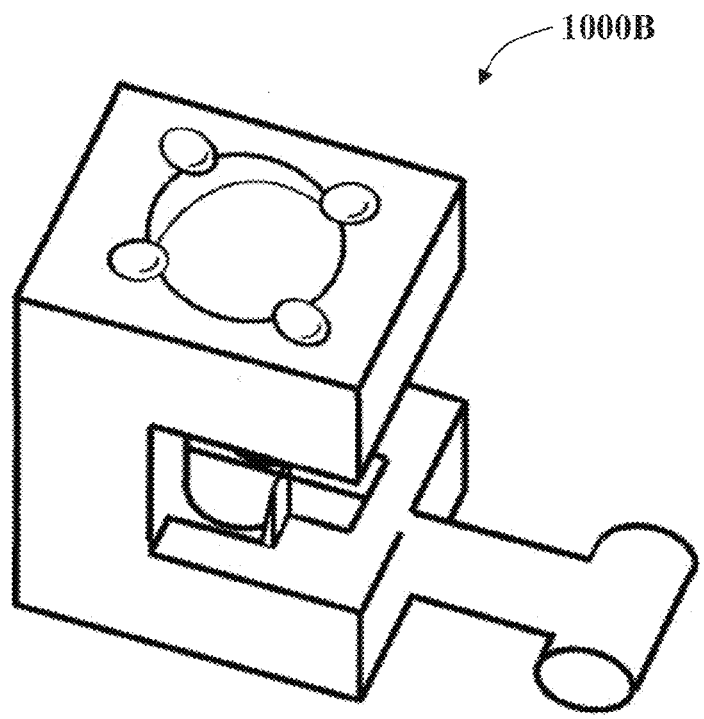
FIG. 10B is a schematic illustration of a chain-link element design option including a paved setting, as a possible usage of the currently disclosed subject matter.
Figure 10C:
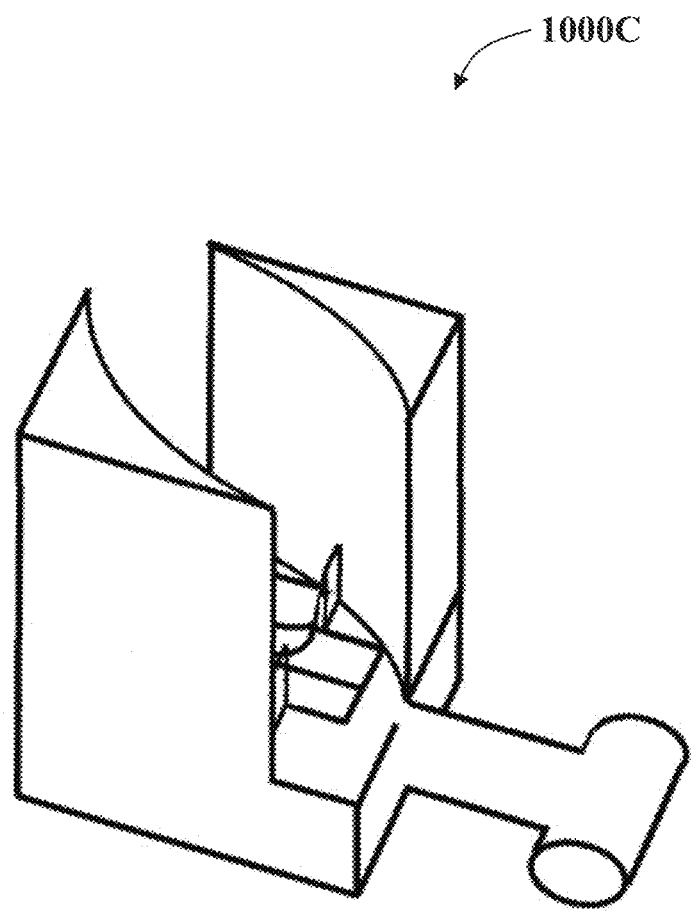
FIG. 10C is a schematic illustration of a chain-link element design option including a bars' setting, as a possible usage of the currently disclosed subject matter.

Configuration Options:

As illustrated, FIGS. 10A-C there are provided schematic illustrations of a chain-link element various configuration options, as a possible usage of the currently disclosed subject matter.

The configuration option, which is generally indicated at 1000A represent a chain-link element configuration option including four claws;

The configuration option, which is generally indicated at 1000B represent a chain-link element configuration option including a paved setting; and The configuration option, which is generally indicated at 1000C represent a chain-link element configuration option including a bars' setting.

Figure 11A:
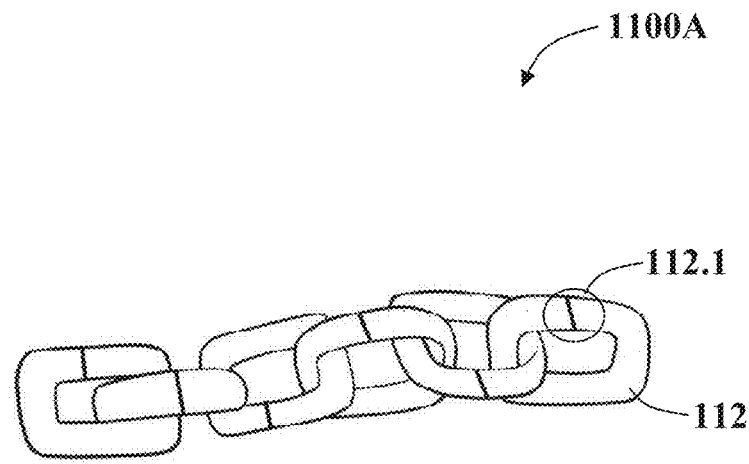
FIGS. 11A-B are schematic illustrations of a chain made of chain links requiring to use soldering techniques, as may exist with prior art technology.

Prior Art Soldering:

As illustrated, FIG. 11A, there is provided a schematic illustration of a chain made of chain links requiring soldering techniques, which is generally indicated at 1100A, and as may exist with prior art technology. The illustration 1100A providing a chain comprising a set of chain links where each chain, such as chain link 112 is soldered at a point 112.1.

Figure 11B:
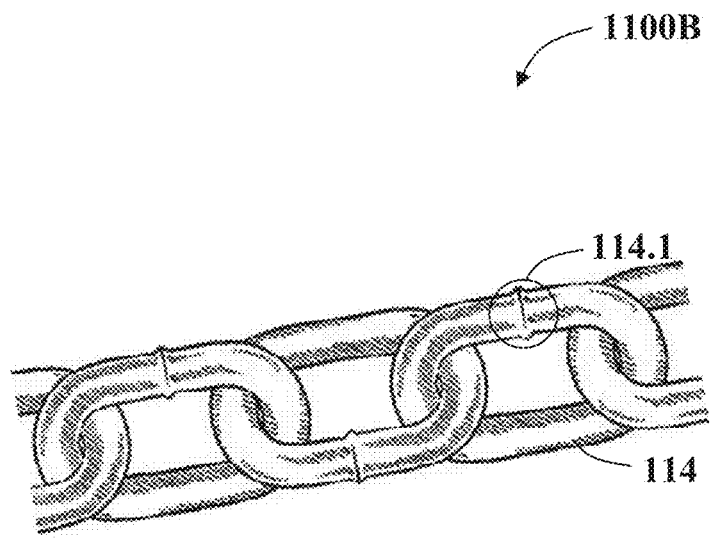

As illustrated, FIG. 11B, there is provided another schematic illustration of a chain made of chain links requiring soldering techniques, which is generally indicated at 1100B, and as may exist with prior art technology. The illustration 1000B providing a chain comprising a set of chain links where each chain, such as chain link 114 is soldered at a point 114.1.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

The scope of the disclosed subject matter is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A chain-link configured to connect with at least one mating chain-link to form a chain element, said chain-link comprising:
    a shaped-body having a longitudinal axis, a lateral axis and a vertical axis;
    at least one coupling-pin comprising a shank protruding distally from said shaped-body, said shank having a shank-length measured along said longitudinal axis and a shank-width measured along said lateral axis; and a pin-head extending from the distal end of said shank said pin-head having a head-thickness measured along said vertical axis and a head-width measured along said lateral axis,
    at least one coupling-socket, comprising:
        a pin-bed within said shaped-body, said pin-bed configured to accommodate a mating pin-head associated with said mating chain link; and
        a coupling-slot extending through said shaped-body along a vertical axis traversing said pin-bed at an angle and configured to enable introduction of said mating pin-head into said pin-bed; and
        a locking mechanism configurable to secure said mating pin-head associated with said mating chain-link, within said pin-bed associated with said chain link;
    wherein said locking mechanism is configurable to secure said pin-head associated with a first link-element within said pin-bed associated with a second link-element; and
    wherein said coupling-slot has a slot-length measured along said longitudinal axis and a slot-width measured along said lateral axis, and wherein said slot-length is larger than said head-width and said slot-width is larger than said head-thickness but smaller than said head-width.

2. The chain-link of claim 1, wherein said locking mechanism comprises at least one molded locking strip configured to prevent said mating pin-head to move out of said pin-bed.

3. The chain-link of claim 1, wherein said chain element is selected from a group comprising a necklace, a necklet, a bracelet, an armlet, a strap, a strip, a ribbon, a band, an earring, an anklet, a chain extender and combinations thereof.

4. The chain-link of claim of claim 1, wherein said shaped-body is made of material selected from a group of gold, silver, steel, aluminum, copper, brass, nickel, rhodium, platinum, palladium, copper or combinations thereof.

5. The chain-link of claim 1, said pin-bed comprising: a first depression and a second depression;
    wherein said first depression and said second depression form two support shelves configured to support said pin-head.

6. The chain-link of claim 1, said head-width being greater than said shank-width.

7. The chain-link of claim 5, said first depression having a first-shoulder-length measured along said lateral axis; and said second depression having a second-shoulder-length measured along said lateral axis;
    wherein said first-shoulder-length and said second-shoulder-length is larger than said head-thickness.

8. The chain-link of claim 5, said pin-bed having a pin-bed-length measured along said longitudinal axis and a pin-bed-width measured along said lateral axis; and
    wherein, said pin-bed-length is shorter than said shank-length, and said pin-bed-width is larger than said shank-width.

9. A chain coupling mechanism configured to connect a first link-element with a second link-element, said chain coupling mechanism, comprising:
    at least one coupling pin comprising a shank protruding distally from said first link-element, said shank having a shank-length measured along said longitudinal axis and a shank-width measured along said lateral axis; and a pin-head extending from the distal end of said shank, said pin-head having a head-thickness measured along said vertical axis and a head-width measured along said lateral axis; and
    at least one coupling socket within said second link-element, comprising:
        a pin-bed configured to accommodate said pin-head associated with said first link-element;
        a coupling-slot extending vertically through said second link-element traversing said pin-bed at angle and configured to enable introduction of said pin-head associated with said first link-element in said pin-bed; and
    a locking mechanism;
    wherein said locking mechanism is configurable to secure said pin-head associated with said first link-element within said pin-bed associated with said second link-element; and
    wherein said coupling-slot has a slot-length measured along said longitudinal axis and a slot-width measured along said lateral axis, wherein said slot-length is larger than said head-width and said slot-width is larger than said head-thickness but smaller than said head-width.

10. A chain coupling mechanism configured to connect a first link-element with at least one second link-element, said chain coupling mechanism, comprising at least one of: a coupling pin and a coupling socket,
    said coupling pin comprising a shank protruding distally from said first link-element, said shank having a shank-length measured along said longitudinal axis and a shank-width measured along said lateral axis; and a pin-head extending from the distal end of said shank, said pin-head having a head-thickness measured along said vertical axis and a head-width measured along said lateral axis from a first lateral face to a second lateral face;
    wherein said coupling pin is configured to be introduced into at least one coupling socket via a coupling-slot extending vertically through said second link-element and such that said pin-head associated with said first link-element is accommodated by a pin-bed within said second link-element, said pin-bed configured to accommodate said pin-head; and
    said coupling socket, comprising:
        a pin-bed within said second link-element, said pin-bed configured to accommodate a pin-head associated with said first link-element; and a coupling-slot extending vertically through said second link-element traversing said pin-bed at an angle and configured to enable introduction of a coupling pin associated with said first link-element; and a locking mechanism;

wherein said locking mechanism is configurable to secure said pin-head associated with said first link-element within said pin-bed associated with said second link-element, and wherein said coupling-slot has a slot-length measured along said longitudinal axis and a slot-width measured along said lateral axis, wherein said slot-length is larger than said head-width and said slot-width is larger than said head-thickness but smaller than said head-width.

11. The chain coupling mechanism of claim 10, consisting of said coupling pin configured to couple with an element having a mating chain coupling socket.

12. The chain coupling mechanism of claim 10, consisting of said coupling socket configured to couple with an element having a mating chain coupling pin.

13. The chain coupling mechanism of claim 10, comprising a plurality of said coupling pins.

14. The chain coupling mechanism of claim 10, comprising a plurality of said coupling sockets.

* * * * *